Feb. 7, 1950 A. GELARDIN 2,496,709
FLAT PRIMARY BATTERY AND CELL UNIT
Filed July 17, 1948
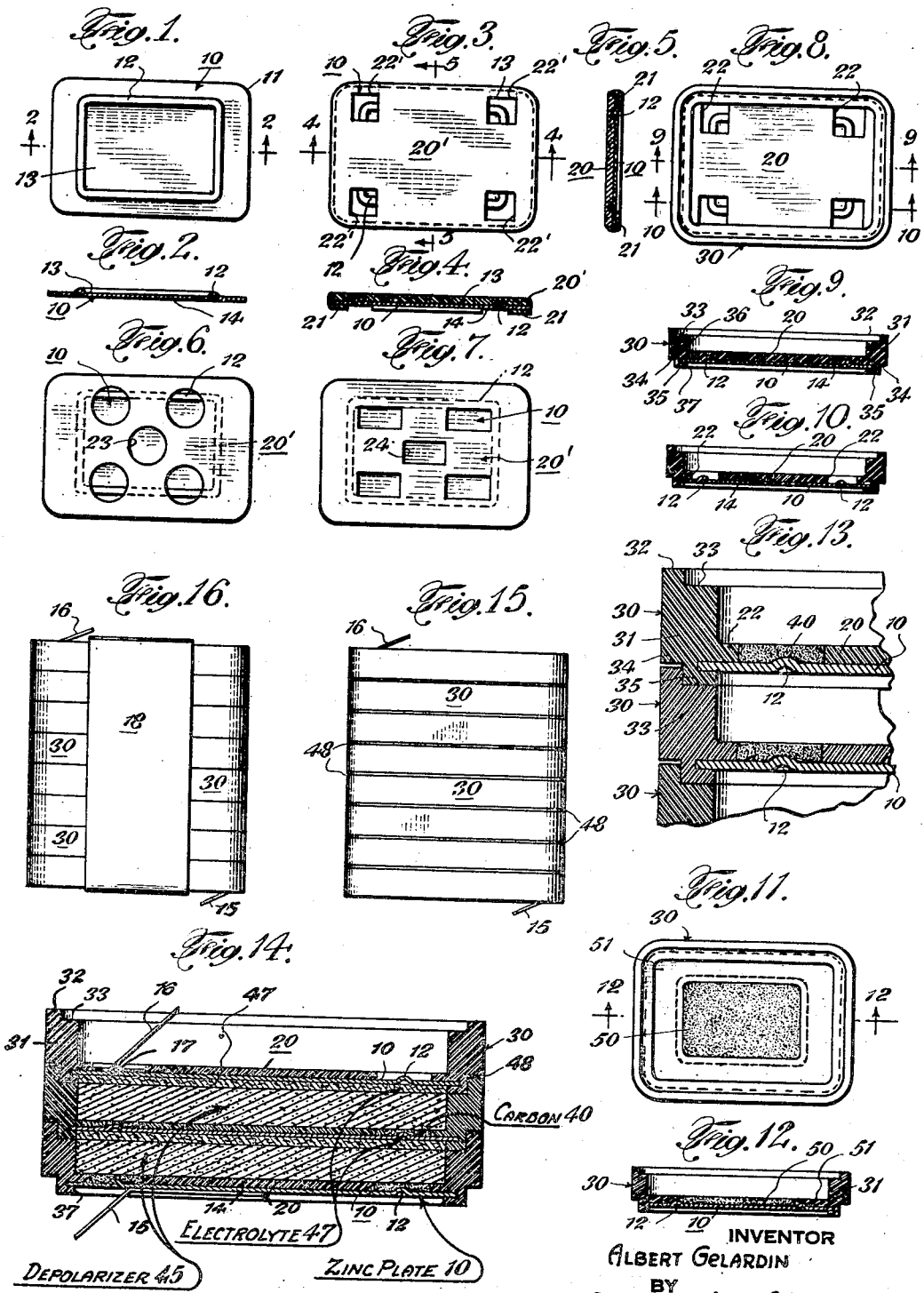
INVENTOR
ALBERT GELARDIN
BY
Frederick A. Norton
ATTORNEY Patented Feb. 7, 1950

2,496,709

UNITED STATES PATENT OFFICE 2,496,709

FLAT PRIMARY BATTERY AND CELL UNIT

Albert Gelardin, New York, N. Y.

Application July 17, 1948, Serial No. 39,220

7 Claims. (Cl. 136—111)

This invention relates to improvements in flat pack primary batteries comprised of interfitted cell units with insulating frames in mutual, snap-lock engagement, and to individual cell units with flat, duplex electrodes encased in the cell frames, the collecting surfaces of the electrodes being formed of one or more compressed, impervious masses of conductive carbon embedded in and supported by pockets in relatively thick crush- and chemical-resistant foraminous surfacings integral with the cell frames. The invention also relates to cell frames of novel construction incorporating duplex electrodes with foraminous, crush-resistant, plastic covered collecting surfaces formed in place, and to separately formed crush-resistant, plastic covered electrodes, as well as to novel methods of fabrication of cell units including the application of depolarizer masses under high pressure, and without crushing of the composite plastic surfacing and contained carbon collecting material.

Dry batteries of the so-called flat pack type are known in which the several cells are comprised of juxtaposed cell elements having flat plate duplex electrodes with electrolyte on one surface of the plate and depolarizer on the other surface, and wherein at least two elements are required to be used to form a single cell.

In the solderless batteries of the type described, the point of greatest weakness is in the carbonaceous collecting surface. Duplex plate electrodes generally comprise a zinc sheet, one surface of which is coated with a film of chemically resistant and insulating paint or lacquer embodying a sufficient amount of a conductive, carbonaceous material, such as graphite, to insure conductive connection from the zinc plate to the depolarizer mass, which is electrically and mechanically apposed to the collecting surface. Depolarizer masses, including manganese dioxide as a depolarizing element, are characterized by the fact that the dioxide is a fairly coarse, particulate material, which is appreciably stronger and more crush-resistant than the film-like, plastic surfacings used as vehicles for the conductive carbonaceous materials of the collecting surface. When, according to current manufacturing practices, the flat pack cell elements or cells are fabricated, it is customary to apply the depolarizing mass mechanically or manually, by forcing it into contact with the carbonaceous collecting surface. However, as noted immediately above, these relatively thin lacquer or plastic collecting surfaces are not crush-resistant, and it is not possible to compress depolarizer mixes directly onto the carbonaceous surfaces, using standard tabletting machines, because of the enormous number of rejects in cells that would arise from the crushing of the plastic-carbonaceous collecting surface of the duplex electrodes by the relatively coarse grained manganese dioxide particles of the depolarizer. Additionally, the plastic-bonded, carbonaceous collecting surface of the standard duplex electrode is substantially coextensive in area with the opposite or active electrode surface of metal. The collecting surface, being relatively inert, does not require the surface area that the active zinc surface of the duplex electrode does. As a matter of fact, I have found that a few, so-called collecting points of carbonaceous material, on the non-active, collector surface of the duplex electrode, are sufficient to maintain the cells in fully operative condition. In any event, considerably less than half of the surface area of the collecting surface of the duplex electrode is required to make the cells function efficiently.

I have also found that the relatively small or miniature flat pack batteries, and the cells and cell elements therefor, can be made with the use of tabletting machines for compressing the discrete manganese dioxide depolarizer directly in place, in good mechanical and electrical contact with the collecting surface or points of the duplex electrode, and without rupturing the impervious, carbonaceous collecting surfaces. This eminently desirable result is attained by providing the collector or depolarizer side of the duplex electrode with a relatively thick, crush- and chemical-resistant foraminous protective sheet of plastic material, such as cellulose acetate, integral with the frame which is formed of the same material. This protective, plastic covered surface is preferably molded integrally with the cell frame embedment of the plate electrode, and is formed with one or more openings. The openings in the foraminous, plastic covered surface form pockets having a bare, metal bottom, being the exposed surface of the metal plate electrode. These pockets are filled, substantially flush with the surface, with compressed carbon (graphite) contained or dispersed in a minimum of insulating binder, such as paraffin, the mix being compressed, under suitable pressure, into the pockets to provide collecting points in good mechanical and electrical contact with the zinc plate. The compressed carbon masses are desirably flush with the surface of the crush-resistant plastic surfacing of the duplex electrodes, as shown in the drawings. The relatively coarse, granular manganese dioxide depolarizer mix is then compressed in place, on and over the foraminous plastic protective sheet, in intimate mechanical and electrical contact with the carbon collecting masses or points. I have found that, due to the relatively great thickness of the protecting plastic sheet, the carbon-binder mass can be subjected to substantially enormous pressures, because each said mass is substantially flush with the surface of the plastic sheet, and is provided with a lateral wall support by the walls of the pockets in the protective plastic sheet in which it is contained.

The duplex electrodes contemplated herein will comprise a metal plate of any suitable metal, such as zinc, provided with one or more guide points or indentations for aligning the plates in plastic forming molds. Each plate has one surface completely covered by a heavy plastic sheet which is molded integrally with the cell frame which embeds the edges of the metal plate, providing an hermetic and liquid-tight seal for such edges and defining an open, bare metallic surface opposite to the protective surface. This bare metallic surface serves as the active electrode surface of the cell. The protective surface is apertured to provide one or more pockets, into each of which is compressed a conductive carbon mass (comprised of 95%–98% graphite), contained in a minimum amount of an insulating binder, such as paraffin, each said compressed carbon mass being substantially flush with the surface of the plastic element in which it is contained.

The carbonaceous collecting mass may be prepared by ball milling graphite to a desired fineness, of the order of 200 to 325 mesh, and incorporating a binder material such as paraffin. The paraffin may be incorporated with the pulverized graphite in a number of ways. One suitable way is to dissolve the minimum amount of paraffin required in a volatile solvent. The paraffin solution is then mixed with the pulverized graphite and thoroughly milled, so that the individual particles are severally coated with a fine, almost molecular film of the paraffin. When the graphite and the paraffin have been thoroughly mixed, and the paraffin uniformly distributed throughout the mass, the mixture may be subjected to any suitable treatment to remove the solvent. The resulting plastic mass will be essentially comprised of graphite particles severally coated by thin films of paraffin. Optionally, the paraffin- or wax-bonded graphite mix may be prepared by the direct milling of relatively hard waxes of the paraffin group, including natural waxes as well as those derived from petroleum refining. These harder, higher melting waxes are more friable than the plastic, low-melting waxes, and are more suited to dry mixing with pulverized graphite.

In addition to paraffin and impervious, dielectric insulating materials of this nature, the invention comprehends the use of suitable thermosetting or thermoplastic compositions which can be combined with the pulverized graphite while the plastics are in an intermediate stage of polymerization, the polymerization being completed by the action of heat and pressure, or by the incorporation of organic peroxides or other cold polymerizing catalytic agents. The formation of conductive, powdered graphite masses, incorporating a minimum amount of a chemical resistant and insulating plastic material is a particular feature of novelty of the present invention, as such compositions are specially adapted for use in connection with the foraminous, plastic covered, duplex plate electrodes of the present invention. The use of such compositions under the conditions and in the structures hereinabove described is a novel advance in the art of fabricating duplex plate electrodes, and the unexpected and useful results flowing from such use are presented as features of novelty and advantage of the present invention.

The plastic dielectric-bonded graphite mass, prepared in any suitable manner, is made up into tablets which are fed to a tabletting machine and introduced and compressed into the collecting areas or pockets formed by the openings in the protective plastic shield or surface of the collector side of the duplex electrode. When the collector mass, comprised essentially of graphite, as noted, is subjected to high pressure, paraffin is squeezed out from between the particles of graphite, forming with the graphite a two-component system in which there is continuous graphite-to-graphite contact within an embedment comprising a minimum amount of solid paraffin. The paraffin, in its compressed and solidified condition, acts as an efficient insulating mass and chemically resistant material, suitable to prevent the permeation of the collector mass by the electrolyte with which the manganese dioxide depolarizer is wetted. As already noted, because of the relatively great thickness of the puncture-proof, foraminous protective plastic sheet, the pocket or pockets therein provide lateral support for the bulk of the contained carbonaceous collector masses, desirably flush with the plastic surface, forming therewith a substantially flat, even surface, which permits the application of relatively enormous pressure to the collector surface, including such masses, all of which makes for increased electrical and chemical efficiency.

With the carbonaceous collector masses in place, and substantially flush with the surface of the plastic, the manganese dioxide depolarizer masses are compressed in place, on top of the collector surface, and under any suitable pressure, without crushing or breaking the carbon collector masses or the protective plastic sheet in which they are embedded. All of this because of the structural strength of the foraminous surface member of plastic in which the carbon collector masses are embedded. The bibulous retainer for the immobilized electrolyte is then inserted in place on the opposite side of the duplex electrode.

With the use of the improved duplex electrode herein, the formation of cell elements, as set out in my application hereinabove identified, can proceed in the usual manner. In other words, the duplex electrode blanks can be set up in a molding machine, the metal plates being suitably conformed to provide aligning or guide points to insure uniformity and proper setting in the mold. The plastic, insulating frame element and the apertured protective plate surfacing are then simultaneously molded, as a unit, in place around the edges and over the top surface of each metal blank, the frame member providing a marginal embedment and hermetic seal for the plate itself, and being integral with the protective surfacing.

The so-formed, plastic covered, duplex electrodes of the invention herein are so oriented, with respect to the walls of the insulating frame in which they are incorporated, that they form essentially two pans or shallow chambers with the frame. The upper pan is relatively deep and receives the depolarizer mix. The lower pan is relatively shallow and receives the blotting paper or other bibulous material which is to be used to receive the charge of electrolyte and immobilize the same.

In the fabrication of the novel cell units herein, the metal electrode plates are mounted in an injection press on an anvil which is provided with location pins or ridges adapted to register with the grooves or indentations formed in the plates. The press is provided further with a molding head incorporating one or more aperture-forming projections or bosses which engage the plate surface which is to be plastic covered. Molten plastic is then injected into the molding chamber, simultaneously forming a dielectric plastic frame around and about the edges of the plate with an integral, apertured protective surfacing on one face of the plate. By this procedure, the electrode plate is embedded in the plastic frame and hermetically sealed, and its apertured, plastic covered surface is formed integral with the frame. The injection molding presses are adapted for automatic operation, so that electrode plates stacked in a feeder hopper are automatically delivered to the press and finished cell frame units are automatically discharged.

The openings in the foraminous, plastic covered protective surfacings of the novel cell units herein form supporting pockets adapted to receive impervious carbon masses, substantially flush with the surface thereof, and forming carbonaceous collecting points or areas of suitable number, which are appropriately spaced to provide iso-potential current drainage over the entire contacting surface of the depolarizer mass, which is in uniform mechanical contact therewith, and with the plastic covered surface of the electrode plate. To this end, the plastic-bonded, electro-conductive carbonaceous material, in tablet form, is inserted in the pockets and compressed into intimate mechanical and electrical contact with the electrode plate by the application of suitable pressure. This step may take place in any suitable press, the frame itself, or guide sections on the bottom of the electrode plate, serving to locate the cell units uniformly in the press. After the densified, impervious carbon collector masses or areas have been formed in place in the openings in the plastic protected surface of the duplex electrode, the discrete manganese dioxide depolarizer is introduced into the deeper pan and compressed uniformly on and over the flat surface of the plastic member and contained carbon points, as in a tabletting machine, under high pressure, so as to insure good mechanical and electrical bonding of the so compressed depolarizer mass with the carbonaceous collector areas or masses of what is now the collector surface of the duplex electrode.

At this point, it is to be noted that the novel duplex electrode of the present invention comprises essentially a metal plate embedded in a plastic dielectric frame, the lower, bare metallic surface of the plate forming the bottom of an inverted shallow pan, and the upper surface, protected, over the greater part of its metallic surface, by a crush-resistant, foraminous plastic sheet integral with the frame, forming the bottom of a deep pan. The collector surface of the duplex plate electrode is formed by one or more of the highly compressed, plastic-bonded, impervious, conductive carbonaceous masses embedded in and laterally supported by the iso-potentially oriented pockets in the protective sheet, and substantially flush with the surface thereof, the collector mass, or masses, being in good mechanical and electrical contact with the electrode plate.

As noted, the plastic covering of the collector surface of the duplex electrode due to the lateral support provided by the walls of the pockets to the contained, substantially flush surfaced carbon collector masses, eliminates the danger of damage to the conductive collector material during the compression of the depolarizer mass uniformly on and over the flat surfaced, composite dielectric-collector, into good mechanical and, therefore, good electrical contact with the collector embedded masses. Additionally, because of the relatively minor amount of carbonaceous material which is necessary for the effective functioning of the collector surface, considerable savings in such material are made, while rejections, due to crushing of relatively thin plastic bonded sheets of carbonaceous conductive material extending over the whole electrode surface, are substantially completely eliminated.

With the depolarizer half or side of the novel two-part or semi-cell unit formed, as above described, the immobilized electrolyte pad or other member is then set into place in the lower shallow pan.

Usually, and desirably, when the depolarizer mass is compressed into position under the high pressures permitted by the present cell element construction, it will be slightly moistened to permit flow of the materials under the applied pressure.

A modification of the carbonaceous collecting surface of the duplex electrode, and contemplated in the present invention, involves the use of a preformed slice or slab of solid carbon, which is suitably adhered to the center of the electrode plate, and is protected at its edges by a plastic band which is formed integral with the cell element frame. With the use of relatively thick slices or slabs of conductive, solid carbonaceous material, the disadvantages resulting from the crushing of thin films of plastic containing carbonaceous material are also avoided. However, the plastic covered, collector surface, previously described, is electrically equivalent to the full surface carbon plate or electrode surface, and is much more suited to machine fabrication and assembly by the use of tabletting machines.

The individual cell elements, fabricated as above described, may be used directly, after the depolarizer mass and the bibulous electrolyte immobilizer have been wetted with appropriate amounts of electrolyte. Such units may also be packaged in hermetically sealed envelopes which are liquid-resistant, and assembled, in appropriate numbers, at the time of use to give batteries of the desired voltage and amperage. If the electrolyte-holding blotting paper, or the depolarizer mass dry out before use, they can be restored to active condition by wetting with sufficient water to saturate them.

A particular feature of novelty and advantage of the present invention flows from the snap-locking interengagement of assembled cell units. This feature permits an array of cell units to be assembled into a battery of desired capacity by snap-locking interengagement of the cell units. Spraying or painting of the surface of such battery with a solvent for the cell frames will result in the permanent joining of the cell frames by and in an autogenous plastic sheath whereby to form a rigid, monolithic battery casing. Other methods of forming battery casings include the cementing of the cell frames together, or the mechanical clamping of the frames in suitable holders.

In some forms of flat pack primary cells the cell frames and duplex electrodes are not interbonded, and special depolarizer preforms are laid in place on collector surfaces. The plastic covered, duplex electrode of the present invention can be used to advantage in such cells, and the plastic covering of the plate electrodes can be effected in injection presses, with the conductive carbonaceous collector masses compressed in place, as embedments, in the pockets of the plastic covered surface of the duplex electrode, and desirably flush with the surface thereof, in the manner described hereinabove. The resulting duplex, flat electrodes are superior to those using filmy collector surfaces, and have the advantage of being self-sufficient and structurally integral and self-supporting.

Where permanent battery structures are not desired, or where it may be desired to vary the electrical characteristics of given battery installations, the cell elements may be assembled without the use of hermetic sealing material, and will be held in proper structural relation with the depolarizer mass of one cell element in good mechanical and electrical contact with the electrolyte of the next succeeding unit, by strapping the assembly in any suitable manner and with any suitable material, or by binding the surface of the assembled cells with suitable adhesive tapes or sheet material.

It is, therefore, among the features of novelty and advantage of the present invention, to provide flat cell elements for so-called flat pack batteries adapted for use in hearing aids and the like, wherein the individual elements do not comprise complete cells, but contain a duplex electrode in a plastic frame, separating the depolarizer mass and the electrolyte at the active surface of the duplex electrode, whereby at least two such cell elements must be apposed, with the electrolyte of one cell element in good mechanical contact with the depolarizer mass of a cooperating element, to form a cell or battery unit. Other objects and features of novelty and advantage of the present invention include the use of special, plastic covered, duplex electrode members comprising flat plates covered with a protective foraminous plastic sheeting which is apertured to receive and support conductive carbonaceous collecting masses, as embedments, in good mechanical and electrical contact with the the metal of the electrode and form a duplex electrode therewith, and in good mechanical and electrical contact therewith, under high compression in automatic tabletting machines.

These and other desirable features and objects of novelty and advantage of the present invention will be described with respect to certain preferred embodiments illustrated in the accompanying drawings, in which Fig. 1 is a plan view of a flat metal plate having locating elements formed therein;

Fig. 2 is a section taken on line 2—2 of Fig. 1;

Fig. 3 is a view similar to Fig. 1, with a preformed protective foraminous plastic covering secured on and over the one surface of the electrode plate;

Fig. 4 is a section taken on line 4—4 of Fig. 3;

Fig. 5 is a transverse section taken on line 5—5 of Fig. 3, and at right angles to the section of Fig. 4;

Figs. 6 and 7 are views similar to Fig. 3, showing modifications of the aperture arrangement in preformed protective sheets;

Fig. 8 is a plan view of a unitary cell frame and a foraminous protective surfacing as simultaneously molded in place around and over an electrode;

Fig. 9 is a section taken on line 9—9 of Fig. 8, showing the unitary structure of the protective surfacing of the electrode plate and the frame;

Fig. 10 is a section taken on line 10—10 of Fig. 8, showing the carbonaceous collector mass-receiving pockets in the protective surfacing;

Fig. 11 is a plan view of a cell unit with a massive slab collector member;

Fig. 12 is a section taken on line 12—12 of Fig. 11;

Fig. 13 is an enlarged fragmentary view of the framing elements of an assembly of cells showing the compressed embedments of the carbonaceous collector masses substantially flush with the surface of the crush-resistant plastic surfacing of the duplex electrode, and illustrating the lateral wall support of the embedments by the walls of the pockets in which they are contained;

Fig. 14 is a partial vertical section through a series of cells forming a battery unit;

Fig. 15 is an elevation of a battery of assembled cell elements secured by cementing, and Fig. 16 is a view similar to Fig. 11, showing a mechanical holding and compression means for the battery elements.

Referring now to the drawings, there is shown, in Figs. 1 and 2, a plate suitable for use in a duplex electrode of a flat pack battery, comprising a sheet metal member 10, desirably of zinc. As shown, the plate is rectangular in shape, having rounded corners 11, and provided with mold aligning guides or ridges 12, here shown as a raised rectangular ridge generally conforming to the periphery of the plate member 10. While the section 12 is shown as a continuous rectangular groove or ridge, it is to be noted that the mold locating sections may be individual dots or indentations, placed anywhere on the surface of the sheet, and in any suitable number. The metal plate or blank will have its faces or surfaces 13, 14 forming part of a duplex electrode. The surface 14, as herein indicated, will constitute one electrode or active surface of the duplex electrode, while the surface 13 will be in mechanical and electrical contact with carbonaceous collector masses, as will be described more fully hereinafter.

Referring now to Figs. 8, 9, 10, 13 and 14, the cell unit will be seen to comprise a dielectric insulating frame 30 and a foraminous protective surfacing sheet 20 simultaneously molded in place around the periphery and over one surface of the electrode plate 10. The frame 30 comprises a continuous wall member 31 having a top marginal rim 32, rabbeted to form an inwardly extending upper shoulder 33, a lower marginal inset or jog 34, equal in width to the upper rim 33, and a base 35 conforming to the upper shoulder 33. The inner wall of the frame 30 is divided by the plate 10 and the integral protective sheet plastic surfacing 20 into an upper pan or chamber having an inner wall 36 of appreciable depth, and a lower, inverted pan having an inner wall 36 of appreciable depth, and a lower, inverted pan having an inner wall 37 of shallow depth.

The protective plastic surfacing 20, as noted, is formed integral with the frame 30, providing a continuous, hermetic seal, and, with the wall 31, an embedment for the edge or edges of the metal plate 10.

The protective foraminous surfacing 20 is formed with openings 22, defining pockets, each of which will be filled with an embedment comprising a compressed, conductive, plastic-bonded carbonaceous collector mass 40 (Figs. 13 and 14), prepared and described as disclosed hereinabove, the surface of which, as shown, is essentially flush with the surface of the plastic member 20. Considering the showing in the enlarged detail in Fig. 13, it will be seen that the surface protective member 20 is desirably as thick or thicker than the metal plate 10, and that the walls or edges of the pockets formed by openings 22 provide a lateral support to the carbon collector mass 40, which permits the latter to be compressed under maximum pressure, to provide good mechanical and electrical contact with the surface of the metal plate 10. The depolarizer mass 45 is compressed into the upper pan or chamber defined by the inner wall 36 of the cell frame and the upper surface 20 of the protective surfacing of the metal plate 10. It will be noted that the depolarizer mass is highly compressed and is substantially flush with the shoulder or ledge 33 at the top of the wall 31. A bibulous, electrolyte-containing member 47, is set in the relatively shallow, inverted bottom pan defined by the inner wall 37 of that portion of the frame and the active surface 14 of the electrode plate. It will be observed further, and as more particularly illustrated in Fig. 14, that, when the flat cells are superposed and nested, with the bottom ridges 35 of one frame seated on the shoulders 33 of the next subjacent unit, the surfaces of the electrolyte-containing member 47 and the depolarizer mass 45 are in good mechanical, and, therefore, good electrical contact. With a suitable cementing material 48 applied to and joining the surfaces 32 and 34 of juxtaposed cell frames, a unitary battery casing, as shown in Fig. 11, is formed. A suitable cementing material for cellulose ester resins may be made by dissolving the resin in a ketone, such as acetone.

In the form illustrated in Fig. 12, the crush-resistant duplex electrode assumes a different form. In this modification, the metal electrode plate 10 is faced with a preformed slab or slice 50, of impervious conductive carbon of the type used for electrodes in electric furnaces and graphite brushes for dynamos. This carbon electrode is usually conformed to the central portion of the metallic plate 10 and occupies the greater part of the surface area on the face to which it is attached in any suitable manner, as by conductive adhesive or the like. The carbon electrode or panel 50 is desirably thicker than the metal plate to which it is applied, and, in any event, extends a sufficient distance above the top of the ridges 12 to prevent direct contact between the metal of the plate and the depolarizing mass which is later compressed and tamped into the upper pan of the cell unit. In place of the complete protective surfacing 20, the metal surface of the plate 10, extending from the periphery of the carbon slab 50 to the edge of the plate, is surfaced and protected by a flat, annular rim portion 51, which is simultaneously molded with the cell frame 31, and extends over the ridges 12, with its surface desirably flush with the surface of the carbon plate or collector slab 50. The peripheral plastic covering 51 of the duplex electrode may be formed also in the manner illustrated in Figs. 3 to 7, with the edges of the plate embedded in the plastic sheet, which as noted above extends inwardly of the plate to the edges of the carbon slab to which it is bonded. With this particular form of duplex electrode, applicant is able to utilize the highly conductive and impervious graphite electrodes which have been known for so long in electrometallurgy and in brushes for motors and dynamos.

With the self-sustaining, crush-resistant collector surfaces provided in the duplex electrodes of the present invention, not only is applicant's novel frame construction improved and enhanced, but all manner of flat pack cells can utilize this novel duplex electrode to great advantage.

As noted hereinabove the specially protected duplex electrodes of the present invention may be preformed and incorporate impervious, compressed, conductive carbonaceous collector masses as embedments, substantially flush with the surface of and isopotentially distributed in the openings in the plastic covered dielectric surfacing. These preformed duplex electrodes can be used in cells or batteries where the cell elements are loosely assembled and the depolarizer masses are not compressed in place against the cell walls and/or the collector surfaces. The preformed plastic covered duplex electrode blanks illustrated in Figs. 3 to 7, are formed by injection molding of the foraminous dielectric plastic covering over one surface and around the periphery of the electrode plate 13. The surface 13 of the plate electrode 10, is covered with a separate protective surfacing 20', whose edges extend over and embed the periphery of the plate 10, as indicated at 21, and provide a marginal protective sheath for the edges of the electrode plate. As shown in Fig. 3, the protective surfacing 20' is apertured, as shown at 22', substantially adjacent the four corners of the rectangular plate, which apertures form pockets which expose limited, isopotential collecting areas of the metal plate 10. In Fig. 6, circular apertures 23 in the surfacing are shown as five in number, while the rectangular ones in Fig. 7 are designated by the numeral 24. As seen from the various showings, it will be appreciated that the bared metallic surface of the collector surface 13 of the duplex electrode plate 10, which is exposed by several apertures, forms but a relatively small part of the entire surface 13.

Among the features of novelty and advantage of the invention herein flowing from the use of foraminous, crush-resistant plastic coverings on the collector surfaces of the duplex electrodes and the embedment therein of compressed, impervious collector masses to form a composite plate masking and collector surface, is the fact that individual cell units may be mounted in a tabletting machine and the discrete manganese dioxide depolarizing mass, desirably moistened with electrolyte, fed to the machine and compressed in place in the deep pans of the units, under maximum pressure. The use of tabletting machines for the purpose of forming compressed depolarizer masses, in place, in good mechanical and electrical contact with the composite, crush-resistant plastic surfacing and embedded, isopotentially oriented collector masses of duplex electrodes of the novel cell-elements of the present invention, makes for uniformity, both in manufacture, and in the physical and electrical characteristics of the individual cell elements, so that variation in capacity, or current delivering ability, of the individual units is reduced to a minimum, and for given sizes of cell elements, uniformity of performance is to be expected of any and all like elements or replacements.

As shown in Fig. 14, the terminal connections are relatively simple and may comprise a wire or ribbon conductor 15 soldered to the bottom metal surface 14 of the lowermost unit of a battery, or, where the battery units are to be used in casings having special terminal contacts for engaging the batteries, the terminal surface 14 will be directly contacted therewith. In the uppermost cell element of a battery, the carbon collector masses and the depolarizer mass will be omitted and leads 16, either in the form of pigtails or metal plugs having suitable ribbon or wire take-offs, may be soldered in place in one or more of the apertures in the protective sheathing 20, all as indicated at 17 in Fig. 14.

Where special battery installations are utilized, the invention comprehends the use of modified cell units for the terminal or top element of an array of cell elements forming a battery. In such cases, the walls 31 of the frames 30 will be reduced in size or depth so that the top rim, which will be flat, extends just slightly above the surface of the sheathing member 20. In such special terminal frames, the usual apertures may be dispensed with and a single central aperture or slot formed, and of dimensions such that the end of a wire or ribbon lead can be introduced into the slot and soldered in place on the subjacent metal panel. In such cases, the end of the lead is desirably pretinned before being applied to the terminal slot and the latter itself may receive a tinning coat of solder. Where such special terminal frame elements are used, the wire leads or take-offs may be formed in place, before the plastic sheathing member 20 is applied, and secured in the frame, and, of course, before the bibulous electrolyte receiving member 47 is placed in its recess on the under surface of the electrode.

In Figs. 15 and 16 there are shown two batteries, each comprising superposed cell elements nested in snap-locking engagement, and permanently secured together by interposed adhesive, as indicated in Fig. 15, or by a band 18, as shown in Fig. 16. This band will be of any suitable insulating material, such as kraft paper or cellulose base plastics, and the ends can be adhered with any suitable glue or cementing material, including animal or fish glue, rubber cement, and cellulose ester cements or lacquers. Where the snap-locked cell units are to form a monolithic battery block, without the use of inter-frame adhesion, the units will substantially abut, thus providing a continuous outer surface. This surface will be made unitary and uniform by the action of suitable solvents, for plastics, such as ether-alcohol for cellulose ester plastics, and ketones (acetone and its homologs), painted or sprayed on the surface, whereby seepage of the solvent into inter cell cracks will interfuse abutting surface and form a continuous, or monolithic battery block.

It will now be appreciated that there has been disclosed novel flat pack batteries and cell units thereof incorporating duplex electrodes with composite, plastic surfacings embodying crush-resistant, compressed collector masses, the plastic surfacing of the duplex electrode being desirably integrally molded with the plastic cell frames, as well as novel methods for forming flat pack battery cell units including the use of tabletting machines for compressing conductive, plastic carbonaceous collector masses, as impervious embedments, in crush-resistant plastic dielectric surfacings, and for introducing discrete depolarizer mixes, under pressure, into cell frames in good mechanical contact on and over the so-formed, composite plastic base surfacing in good mechanical and electrical contact with its integrally embedded, iso-potential collector masses.

What is claimed is:

1. A primary cell element comprising an integral encircling, non-conductive wall, a zinc plate having its entire periphery embedded in and extending between the inner surfaces of the wall and defining upper and lower recesses therewith; a composite crush-resistant, protective surfacing on the upper surface of the zinc plate and integral with the wall, said protective surfacing being a foraminous member of dielectric plastic having at least one aperture defining a pocket; a compressed, electrolyte-impervious, conductive carbonaceous embedment in the pocket, substantially flush with the surface of the plastic member and laterally supported by the wall of the pocket, and being in good mechanical and electrical contact with the zinc plate and forming a duplex electrode therewith; a tamped depolarizer mass comprised essentially of granular manganese dioxide, in the upper said recess in mechanical and electrical contact with the composite carbon collector mass and protective surfacing, and an immobilized electrolyte in the lower recess in good mechanical and electrical contact with the zinc plate.

2. A battery comprising a plurality of individual duplex separable primary cell elements, each said cell element being pan shaped and comprising an integral wall encircling plastic material forming a cell frame a sheet of zinc extending between and having its entire periphery imbedded in the said wall, a composite, crush-resistant and electrolyte-impervious, collector and protective surfacing of dielectric plastic material on and over one face of the zinc sheet and integral with the wall, the so protected zinc sheet defining pan-shaped upper and lower recesses with the wall; at least one aperture in the protective surfacing defining a pocket with the zinc plate; a compressed electrolyte-impervious, impervious, conductive carbonaceous embedment in the pocket and laterally supported by the wall thereof, and in conductive contact with the upper side of the zinc sheet; a tamped depolarizer in each said upper recess in good mechanical contact with the composite protective surfacing and carbon collector mass, and an immobilized electrolyte in each said lower recess in good mechanical contact with the exposed surface of the zinc plate.

3. Battery according to claim 2, characterized by means in the frames for snap-locking engagement with juxtaposed frames.

4. Battery according to claim 3, characterized by the frames of said interlocked sealing elements being mutually interbonded and forming a unitary, liquid-tight, hermetic battery casing.

5. A primary cell according to claim 2, in which the dielectric surfacing is formed with a plurality of isopotentially oriented apertures, the pockets defined by said apertures and the metal plate severally containing electrolyte-impervious, impervious, conductive collector masses compressed therein in good mechanical contact with the metal plate and forming multiple isopotential collecting points or areas serving collectively as the cathode of the duplex electrode.

6. As an article of commerce, a battery element adapted to be associated with at least one other like element, each said element comprising a duplex plate electrode having an exposed metal surface, and an exposed, crush-resistant, electrolyte-impervious, conductive carbonaceous surface conductively secured to the plate, an encircling dielectric frame in which the entire periphery of the plate is embedded in liquid-tight relation and extending inwardly of the plate to the carbonaceous mass sealing the edges thereof and the marginal areas of the plate surface, the duplex plate and frame defining material-receiving chambers at the faces of the plate, a depolarizer mass in one chamber in mechanical and electrical contact with the impervious and crush-resistant carbonaceous surfacing, and an immobilized electrolyte in the other chamber in good mechanical and electrical contact with the exposed metal surface, whereby upon juxtaposing two or more battery elements with the immobilized electrolyte of one element in direct mechanical contact with the depolarizer mass of an abutted like element, and establishing conductive connection between the terminal poles of an array of juxtaposed elements, a battery circuit is established.

7. A primary cell according to claim 6, wherein said frame is provided with means for snap-locking engagement with juxtaposed frames.

ALBERT GELARDIN.

REFERENCES CITED

The following references are of record in the file of this patent:

UNITED STATES PATENTS

| Number | Name | Date |
|---|---|---|
| 1,624,455 | Yngve | Apr. 12, 1927 |
| 2,272,969 | French | Feb. 10, 1942 |
| 2,307,761 | Deibel | Jan. 12, 1943 |

FOREIGN PATENTS

| Number | Country | Date |
|---|---|---|
| 825,374 | France | Dec. 8, 1937 |
| 269,977 | Great Britain | Apr. 27, 1927 |
| 482,363 | Great Britain | Mar. 24, 1938 |
| 554,926 | Great Britain | July 26, 1943 |

Certificate of Correction

Patent No. 2,496,709 February 7, 1950

ALBERT GELARDIN

It is hereby certified that errors appear in the printed specification of the above numbered patent requiring correction as follows:

Column 6, lines 15 and 16, for the words "collector embedded" read *embedded collector*; column 8, lines 74 and 75, strike out "36 of appreciable depth, and a lower, inverted pan having an inner wall"; column 9, line 12, for "essentially" read *substantially*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*